United States Patent [19]

Wilson et al.

[11] Patent Number: 4,491,300
[45] Date of Patent: Jan. 1, 1985

[54] VALVE WITH IMPROVED SEALING STRUCTURE

[75] Inventors: A. Kenneth Wilson, Aurora; Ronald E. Barker, Somonauk, both of Ill.

[73] Assignee: AMSTED Industries Incorporated, Chicago, Ill.

[21] Appl. No.: 325,102

[22] Filed: Nov. 27, 1981

[51] Int. Cl.³ .............................................. F16K 1/22
[52] U.S. Cl. ..................................... 251/368; 251/306
[58] Field of Search ....................... 251/368, 305, 306; 137/375

[56] References Cited

U.S. PATENT DOCUMENTS

| | | | |
|---|---|---|---|
| 1,649,398 | 11/1927 | Fry | 251/368 |
| 1,824,168 | 9/1931 | Orton | 251/306 |
| 2,396,552 | 3/1946 | Cape | 251/368 |
| 3,325,142 | 6/1967 | Thompson | 251/306 |
| 3,756,560 | 9/1973 | Siepmann | 251/368 |
| 3,994,319 | 11/1976 | Airhart | 251/368 |

Primary Examiner—A. Michael Chambers
Attorney, Agent, or Firm—Charles E. Bouton; Fred P. Kostka

[57] ABSTRACT

A valve including a cast or nodular iron body and a cast or nodular iron valve member having sealing surfaces which seal the fluid passage in the closed position of the valve member. At least one of the sealing surfaces in the closed position is formed by a bonded powder metal layer having high wear and corrosion resistant properties.

4 Claims, 6 Drawing Figures

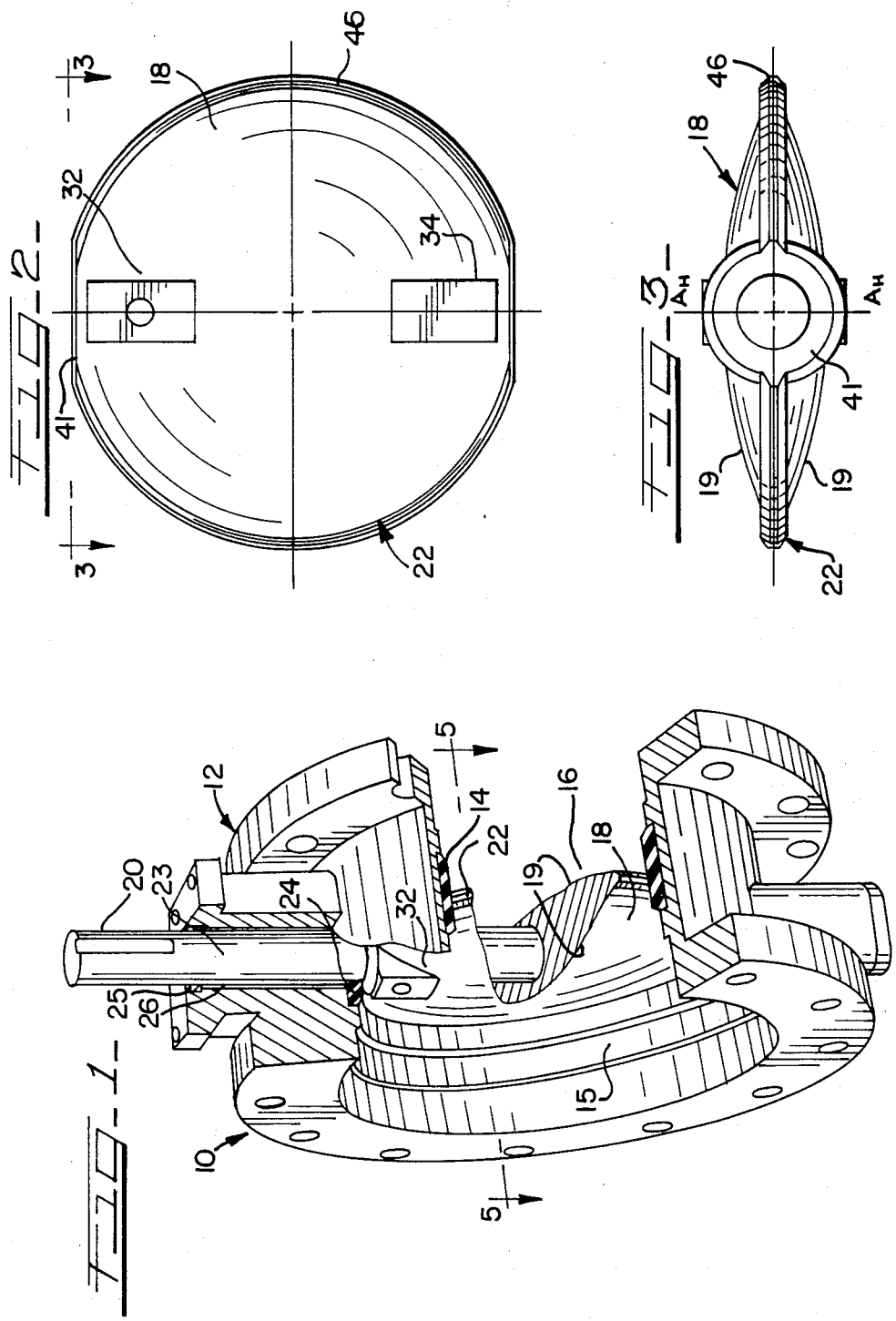

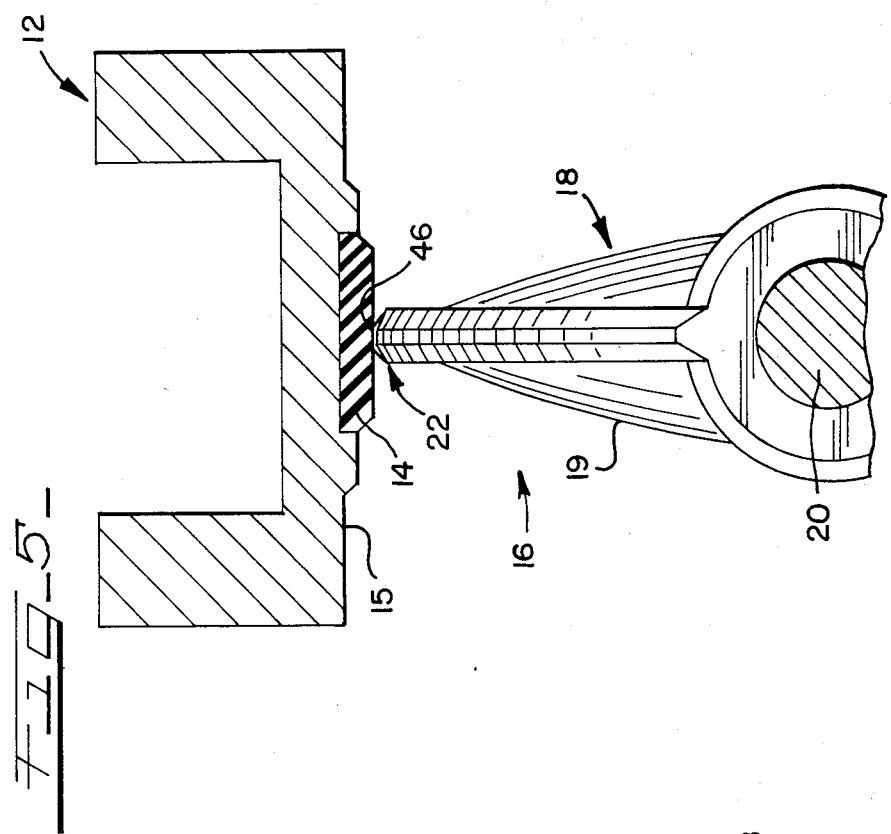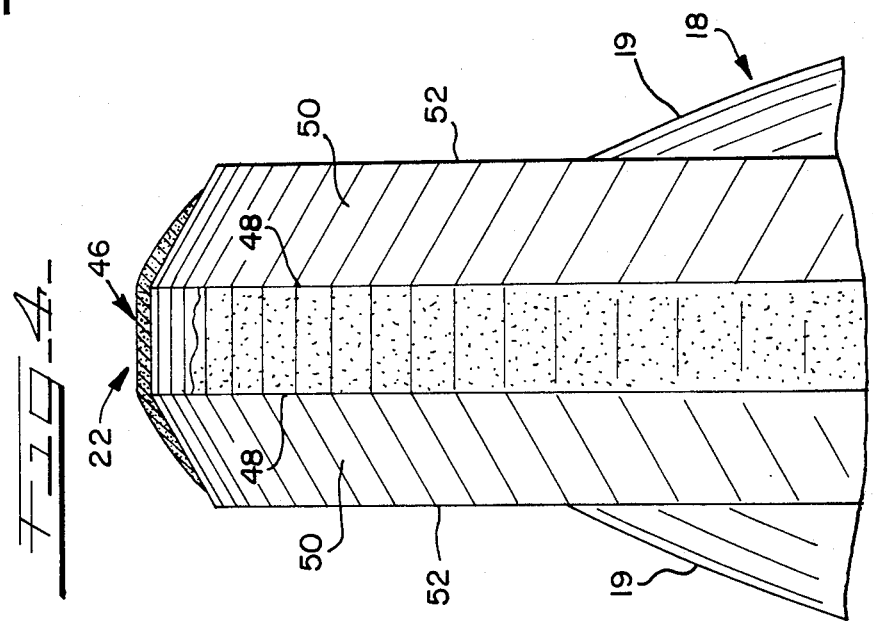

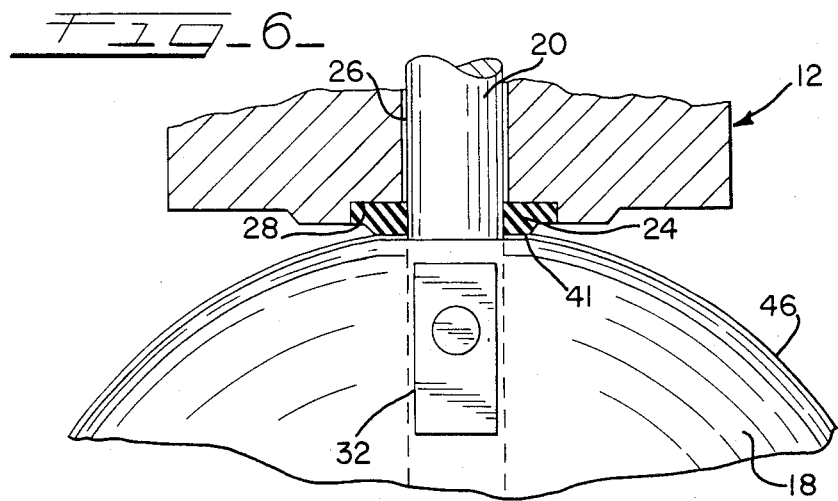

VALVE WITH IMPROVED SEALING STRUCTURE

FIELD OF THE INVENTION

The present invention relates to valves and more particularly to a new and improved sealing structure at the engaging surfaces on the movable valve member and the valve body.

BACKGROUND AND SUMMARY OF THE INVENTION

Valves typically comprise a valve housing having a fluid passage and a valve member movable from an open position permitting flow through the passage to a closed position in which flow is shut-off. In the closed position contacting surfaces on the valve housing and the movable valve member provide a substantially fluid tight seal to assure that all fluid flow is shut-off.

Valves formed of cast or nodular iron are conventionally constructed with at least one of the contacting elements formed of metal and provided with a smooth or fine finish surface. The other of the surfaces may be formed by a resilient sealing member or another machined metal surface. Such machined surface may be metal member having a fine finish and welded to the valve.

A smooth or fine finish is important when a resilient member is provided on the other surface. Failure to provide a smooth metal surface will cause excessive wear or damage to the resilient member during opening and closing so that the useful life of the seal is materially reduced.

Heretofore, valves made from cast or nodular iron have often been constructed with one of the sealing surfaces provided on a separate metallic member having a machined or ground surface and fixed to the valve part mechanically or by welding. This separable structure not only increases the cost of the valve but is also susceptible to undesirable cracking of the cast valve part to which the member is welded. Moreover, the heat generated during welding may cause carbon and impurities from the cast iron to comingle or contaminate the weld attaching the non-corrosive member so that the corrosion resistant characteristics of the welded assembly are reduced thereby decreasing its durability.

The bonded seated surface does not contain crevices characteristic of a mechanically attached separate member which provides a site for corrosive action to occur.

By the present invention it is proposed to provide a valve having a new and improved sealing structure which overcomes the difficulties encountered heretofore.

This is accomplished generally by a valve including a valve body having a fluid passage. A valve member is mounted within the fluid passage for movement allowing the flow of fluid through the passage to a closed position for sealing the passage and preventing flow therethrough. The seal is defined by mating or contacting surfaces provided on the valve body wall defining the passage and the peripheral of the valve member. At least one of the mating surfaces is formed with a bonded overlay composition having a wear resistant, non-corrosive surface capable of being polished to a high finish.

One such composition suitable as a bonded coating is a non-exothermic nickel-chromium powder alloy, for example containing by weight about 18 to 22.5% of chromium and about 68.5 to 72.5% of nickel with the remaining elements including carbon, manganese, silicon and iron.

BRIEF DESCRIPTION OF THE DRAWINGS

In the drawings,

FIG. 1 is a fragmentary and perspective view of a butterfly valve showing a valve disc in a closed position with some of the parts broken away to show underlying details;

FIG. 2 is a side elevational view of the valve disc of FIG. 1 showing an exaggerated thickness of the coating provided by the invention;

FIG. 3 is a top plan view of the valve disc taken along the line 3—3 of FIG. 2;

FIG. 4 is an enlarged fragmentary plan view of the valve disc of FIG. 3;

FIG. 5 is a fragmentary plan view taken along the line 5—5 of FIG. 1;

FIG. 6 is an enlarged fragmentary side elevational view of the valve disc in an open position showing an exaggerated thickness of the coating.

DESCRIPTION OF THE PREFERRED EMBODIMENT

Referring now to the drawing, there is shown a valve 10 embodying the present invention. While the valve 10 is shown as a symmetrical or on-center butterfly valve it should be clearly understood that the invention is also applicable to asymmetrical valves and any type valve structure in which the mating surface portions about a flow passage and the valve closure member form a seal.

The butterfly valve 10 includes a valve body or housing 12 which may be made from cast or nodular iron. Extending axially through the housing is a fluid passage or opening 16 defined by a peripheral wall 15. A sealing ring 14 which may be made from a resilient material, as shown, or metal is seated in the wall substantially midway between the ends of the passage 16.

Disposed within the passageway 16 is a closure member or valve disc 18 also made from cast or nodular iron. The valve disc 18 is lens shaped with the peripheral edge 22 adapted to mate in face to face contact with the resilient seal 14 in the passage 16 forming a seal preventing the passage of fluids therethrough.

An operating shaft 20 extends diametrically through the valve disc 18. The opposite ends of the shaft 20 are journaled in suitable bushings 25 seated in openings 26 formed in the valve housing 12. An operating member (not shown) may be attached to a projecting end of the shaft 20 for turning the valve disc between its open positions (not shown) and a closed position, as shown.

As shown, in particular in FIGS. 1 and 6, resilient rings 24 are seated in recesses 28 formed concentric about the diametrically opposed shaft openings 26. The rings 24 snuggly embrace the shaft 20 and also the flat top surfaces 41 on the bosses 32. The rings in this manner form a fluid tight seal about the operating shaft openings 26.

Sealing of the fluid passage 16 is further accomplished at the valve peripheral edge 22 and the resilient ring 14 of the passage as shown in FIG. 5. Movement between open position and the closed position shown causes a rubbing and compressive action between the mating surfaces of the ring 14 and disc edge 22. It is important that abrasion or friction force be maintained at minimum to maximize the wearability of the sealing surfaces. At the same time if the valve is to be used in a medium causing corrosion of the surfaces, the seal formed at the mating surfaces will be ineffective.

By the present invention the metallic sealing surface is provided by a bonded overlay of powdered metal 46 characterized by its high resistance to wear and corrosion and when applied on the underlying metal member is of such density that no additional sealant is required to prevent fluid access to the underlying metal. More importantly the bonded metal 46 is characterized by being of such fine consistency to form a smooth and non-abrading surface which need not be machined as by grinding or further machining. If further smoothness is required the characteristics of the material are such that it may be smoothed by polishing such as vibratory tumbling or the like. Such bonded overlay is free of base metal dilution or contamination characteristic of conventional welding or welding overlay processes as applied to cast or nodular iron.

One such material is a powdered metal composition of a non-exothermic chromium-nickel alloy having about 70 parts nickel and 20 parts chromium with remaining parts of carbon, manganese, silicon and iron. The powdered composition has a typical size ranging between about −45 microns to +5 microns. Such a powder may be obtained under the designation of METCO 43VF-17 from METCO Inc. located in Westbury, Long Island, N.Y.

The metal powder composition has the following composition:

| Elements | % by Weight |
|---|---|
| Carbon | 0.25 |
| Manganese | 2.5 |
| Silicon | 1.5 |
| Iron | 1.00 |
| Chromium | 18.–22.5% |
| Nickel | 68.5–72.5% |

The metal powder is melted and bonded to the flat surfaces and the edge by the plasma non-transferred arc process using known equipment. The composition is bonded to the peripheral edge and end flat surfaces by rotating the disc about the axis $A_H$ while the molten powder is applied from a stationary or oscillating plasma source. The thickness of the bonded composition controling is maintained at between about 0.005 inch to about 0.020 inch by the rate and duration of flow of the plasma metal. A uniform application of the composition is achieved by rotating the disc about its vertical axis $A_H$. Preferably this thickness is maintained at a thickness of about 0.010 inch.

The powdered metal bond on the planar hub surface and the flat peripheral edge has the characteristics described heretofore and has a substantially non-abrasive surface. However, if further smoothness may be deemed desirable because of the characteristics of the bonded metal layer 46 the layer may be polished by insertion of the disc into a vibratory polisher or the like. This eliminates expensive machining or grinding or the like as required heretofore.

What is claimed is:

1. A valve comprising a cast metal valve body, a fluid passage in said valve body, a cast metal valve closure member in said body for movement from an open position permitting flow through said fluid passage to a closed position preventing flow through said passage, a first mating surface on said valve body within said passage and a second mating surface on said valve member forming a seal with said first mating surface in said closed position of said valve member, a resilient member mounted on one of said first or second mating surfaces, and a metallic powder composition bonded as a layer of substantially uniform thickness of between about 0.005 inch to 0.020 inch on the other of said first or second mating surfaces to provide a smooth, nonporous overlay having wear and corrosion properties, wherein said metallic powder composition includes, by weight, about 20% chromium and about 70% nickel.

2. The invention as defined in claim 1 wherein said particle size of said powder metal composition ranges between about −45 microns to +5 microns.

3. A valve comprising a cast metal valve body, a fluid passage in said valve body, a cast metal valve closure member in said body for movement from an open position permitting flow through said fluid passage to a closed position preventing flow through said passage, a first mating surface on said valve body within said passage and a second mating surface on said valve member forming a seal with said first mating surface in said closed position of said valve member, a resilient member mounted on one of said first or second mating surfaces, and a metallic powder composition bonded as a layer of substantially uniform thickness of between about 0.005 inch to 0.020 inch on the other of said first or second mating surfaces to provide a smooth, nonporous overlay having wear and corrosion properties, wherein said metallic powder composition includes, by weight, 0.25% carbon, 2.5% manganese, 1.5% silicon, 1.0% iron, about 20% chromium and about 70% nickel.

4. A valve comprising a cast metal valve body, a fluid passage in said valve body, a cast metal valve closure member in said body for movement from an open position permitting flow through said fluid passage to a closed position preventing flow through said passage, a first mating surface on said valve body within said passage and a second mating surface on said valve member forming a seal with said first mating surface in said closed position of said valve member, a resilient member mounted on one of said first or second mating surfaces, and a metallic powder composition bonded as a layer of substantially uniform thickness of between about 0.005 inch to 0.020 inch on the other of said first or second mating surfaces to provide a smooth, nonporous overlay having wear and corrosion properties, wherein said metallic powder composition includes, by weight, at least 18% chromium and at least 68.5% nickel.

* * * * *